(12) United States Patent
Patel

(10) Patent No.: US 11,050,437 B1
(45) Date of Patent: Jun. 29, 2021

(54) IMPLEMENTATION OF INVERTIBLE FUNCTIONS USING PARTY LOGIC

(71) Applicant: Mahesh Rameshbhai Patel, Houston, TX (US)

(72) Inventor: Mahesh Rameshbhai Patel, Houston, TX (US)

( * ) Notice: Subject to any disclaimer, the term of this patent is extended or adjusted under 35 U.S.C. 154(b) by 0 days.

(21) Appl. No.: 16/913,038

(22) Filed: Jun. 26, 2020

(51) Int. Cl.
*H03M 13/00* (2006.01)
*H03M 13/11* (2006.01)
*H04L 1/00* (2006.01)

(52) U.S. Cl.
CPC ....... *H03M 13/11* (2013.01); *H03M 13/6575* (2013.01); *H04L 1/0063* (2013.01)

(58) Field of Classification Search
CPC ............. H03M 13/11; H03M 13/6575; H03M 13/3761; H03M 13/2903; H03M 5/145; H04L 1/0063; G06F 11/1012; G06F 11/1076; G06F 11/096

See application file for complete search history.

(56) References Cited

U.S. PATENT DOCUMENTS

| 2008/0104481 | A1* | 5/2008 | Ito ........................ | H03M 13/15 714/758 |
| 2010/0005368 | A1* | 1/2010 | Lee ....................... | H03M 13/15 714/768 |
| 2017/0324425 | A1* | 11/2017 | Busch ................. | H03M 13/616 |

* cited by examiner

*Primary Examiner* — Christine T. Tu
(74) *Attorney, Agent, or Firm* — Leavitt Eldredge Law Firm; Richard Eldredge; Brandon Leavitt

(57) ABSTRACT

Parity logic is widely used in forward error correction codes and error detection codes. When used for error correction and error detection applications, the role of parity bits is to increase code distance by introducing memory between encoded bits and input bits at cost of overhead bits. Present disclosure provide systems and methods for implementing invertible parity functions using parity logic wherein 'k' input bits are received and encoded using a first invertible parity function. The 'k' input bits can be iteratively encoded to obtain nonlinearity and higher dependency between set of encoded parity bits and the 'k' input bits or other data bits. Further the decoding is performed on the set of encoded bits to retrieve original 'k' input bits using a second invertible parity function.

12 Claims, 2 Drawing Sheets

— 201

203 — Receiving one of an input data block or input data sub-block comprising 'k' input bits and other data bits 205 — Encoding the received data block or data sub-block to obtain a set of encoded parity bits, wherein the step of encoding the received data block or data sub-block set comprises performing a first invertible parity function on the received data block or data sub-block 207 — Decoding the set of encoded parity bits to retrieve the 'k' input bits, wherein the step of decoding the set of encoded parity functions bits comprises performing a second invertible parity function on the set of encoded parity bits

IMPLEMENTATION OF INVERTIBLE FUNCTIONS USING PARTY LOGIC

BACKGROUND

1. Field of the Invention

The present invention relates generally to invertible functions implementation systems, and more specifically to implementation of invertible functions using parity logic.

2. Description of Related Art

Data encryption and integrity are two main areas of the modern world data security structure. They both require effective implementation of avalanche effect and nonlinearity as a core design requirements. With the latest advancements in quantum computing and computational power, it has become extremely important to explore potential methods of implementing avalanche effect and nonlinearity to strengthen the data security.

Accordingly, although great strides have been made in the area of invertible functions implementation systems, many shortcomings remain.

SUMMARY

In view of the foregoing, an embodiment herein provides systems and methods for language based generation of user interfaces. In one aspect, there is provided a processor implemented method for implementing invertible parity functions using parity logic. The method comprises: receiving, via one or more hardware processors, one of an input data block or input data subblock comprising 'k' input bits and other data bits like secret keys and round keys, wherein the count of input data bits and other data bits can be identical or different; encoding, via the one or more hardware processors, the received input data block or input data subblock to obtain a set of encoded parity bits, wherein the step of encoding the received input data block or input data subblock set comprises performing a first invertible parity function on the received data block or data subblock, and wherein for the data block or data subblock comprising 'k' input bits, the first invertible parity function is expressed as:

$$f(x_i) = \sum_{j=0}^{n} x_{(i-j)} = x_{(i-0)} + x_{(i-1)} + x_{(i-2)} + \ldots + x_{(i-n)}$$

where i=1, 2, 3, 4, . . . k, $f(x_i)$ represents an encoding function for ith bit, + sign represents XOR or XNOR operation, n is a whole number representing parity function variable limit, $x_{(i-j)}$ represents (i-j)th input bit, and for all (i-j)<1, $x_{(i-j)}$=D (discard); and decoding, via the one or more hardware processors, the set of encoded parity bits to retrieve the 'k' input bits, wherein the step of decoding the set of encoded parity bits comprises performing a second invertible parity function on the set of encoded parity bits, and wherein the second invertible parity function is expressed as:

$$x_i = f(x_i) + \sum_{j=i-n}^{i-1} x_{(j)} = f(x_i) + x_{(i-n)} + x_{(i-n+1)} + \ldots + x_{(i-1)}$$

where i=1, 2, 3, 4, . . . k, + represents XOR or XNOR operation used during the encoding process, $x_i$ represents decoding function for ith bit, $f(x_i)$ represents ith encoded bit, n represents parity function variable limit used during the encoding, $x_{(j)}$ represents jth decoded bit, for all (j)<1, $x_{(j)}$=D (discard), and for n=0, $$\sum_{j=i-n}^{i-1} x_{(j)} = D(\text{discard}).$$

In an embodiment, an identical parity function variable limit 'n' is selected for performing the first invertible parity function and the second invertible parity function to perform encoding and decoding of each individual bit.

In an embodiment, the identical parity function variable limit for each encoding-decoding function pair is one of a constant value or dynamically derived using a predefined or dynamically derived group of input bits or other data bits depending on the application requirements.

The method further comprises iteratively performing the step of encoding the received input data block or input data subblock to obtain a set of encoded parity bits and to obtain non-linearity and higher dependency between the set of encoded parity bits and the 'k' input bits or other data bits.

In an embodiment, the received input data block or input data subblock is iteratively encoded using at least one of one or more permutation sequence boxes, one or more substitution boxes and amalgamation with any existing cryptographic or hash function algorithms.

In another aspect, there is provided a system for implementing invertible parity functions using parity logic. The system includes a memory storing instructions; communication interface(s); and hardware processor(s) communicatively coupled to said memory through said one or more communication interfaces wherein said one or more hardware processors are configured by said instructions to: receive one of an input data block or input data subblock comprising 'k' input bits; encode the received input data block or input data subblock to obtain a set of encoded parity bits, wherein the step of encoding the received input data block or input data subblock set comprises performing a first invertible parity function on the received input data block or input data subblock, and wherein for the input data block or input data subblock comprising 'k' input bits, the first invertible parity function is expressed as:

$$f(x_i) = \sum_{j=0}^{n} x_{(i-j)} = x_{(i-0)} + x_{(i-1)} + x_{(i-2)} + \ldots + x_{(i-n)}$$

where i=1, 2, 3, 4, . . . k, $f(x_i)$ represents an encoding function for ith bit, + sign represents XOR or XNOR operation, n is a whole number representing parity function variable limit, $x_{(i-j)}$ represents (i-j)th input bit, and for all (i-j)<1, $x_{(i-j)}$=D (discard); and decode the set of encoded parity bits to retrieve the 'k' input bits, wherein the step of decoding the set of encoded parity bits comprises performing a second invertible parity function on the set of encoded parity bits, and wherein the second $$x_i = f(x_i) + \sum_{j=i-n}^{i-1} x_{(j)} = f(x_i) + x_{(i-n)} + x_{(i-n+1)} + \ldots + x_{(i-1)}$$

invertible parity function is expressed as:

where i=1, 2, 3, 4, . . . k, + represents XOR or XNOR operation used during the encoding process, $x_i$ represents decoding function for ith bit, $f(x_i)$ represents ith encoded bit, n represents parity function variable limit used during the encoding, $x_{(j)}$ represents jth decoded bit, for all (j)<1, $x_{(j)}$=D (discard), and for n=0, $$\sum_{j=i-n}^{i-1} x_{(j)} = D(\text{discard}).$$

In an embodiment, an identical parity function variable limit 'n' is selected for performing the first invertible parity function and the second invertible parity function to perform encoding and decoding of each individual bit.

In an embodiment, the identical parity function variable limit for each encoding-decoding function pair is one of a constant value or dynamically derived using a predefined or dynamically derived group of input bits or other data bits depending on the application requirements.

In an embodiment, the received input data block or input data subblock are iteratively encoded to obtain a set of encoded parity bits and to obtain non-linearity and higher dependency between the set of encoded parity bits and the 'k' input bits or other data bits.

In an embodiment, the received input data block or input data subblock are iteratively encoded using at least one of one or more permutation sequence boxes, one or more substitution boxes and amalgamation with any existing cryptographic or one-way function algorithms.

Other and further aspects and features of the disclosure will be evident from reading the following detailed description of the embodiments, which are intended to illustrate, not limit, the present disclosure.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
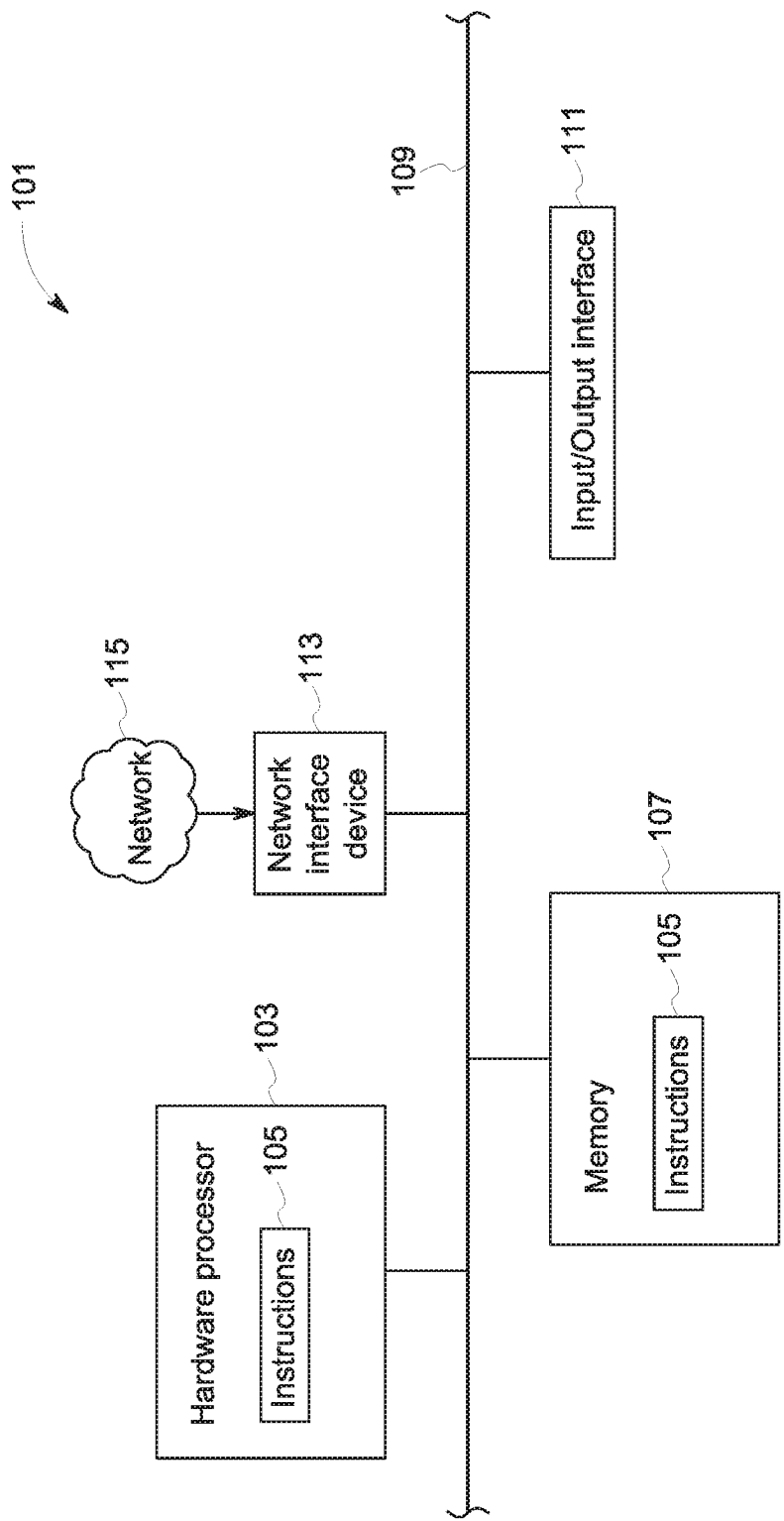
FIG. 1 is a block diagram illustrating a system for implementing invertible functions using parity logic according to some embodiments of the present subject matter.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional invertible functions implementation systems. Specifically, the system of the present invention provides efficient method to implement avalanche and nonlinearity properties. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

As discussed above, parity logic is widely used in forward error correction codes and error detection codes. When used for error correction and error detection applications, the role of parity bits is to increase the code distance by introducing memory between encoded bits and input bits at the cost of overhead bits. Present disclosure provides systems and methods for implementing static or dynamic invertible functions using parity logic without any overhead bits. Here, the term dynamic is used in the context of parity function variable limits and one or more sets of criteria derived using the bits and bit patterns of input data block or other data bits. This function can be utilized to implement an avalanche effect, i.e., change in an input bit triggers significant change, approximately 50% bit flips, in the output.

Further, in symmetric cryptography, cryptographic hash functions, and other data security applications the avalanche effect is the desirable property. There are many standardized and non-standard solutions/algorithms available with different complexity levels and varying in speed. Each solution has its own unique way of realizing the avalanche effect. However, majority of these available solutions lack scalability and logical simplicity, i.e., they are designed for certain fixed block sizes only and hence their performance can be analyzed only for the given block sizes. The above approaches cannot be realized in practical scenarios with smaller block sizes to better understand the underlying design robustness/sustainability against different attacks, vulnerability, and scalability. As the currently set standards are getting old and vulnerable, it is essential to explore new horizon to keep the future data secured.

Present disclosure provides systems and methods that use parity logic to define an invertible parity function without any overhead, which is easy to implement at software and hardware level. Multiple rounds of proposed invertible parity function, one or more appropriate permutation boxes, and one or more substitution box provides a strong foundation for symmetric encryption algorithms, cryptographic hash functions and other data security and authentication applications. This multi round implementation offers scalability and simple, yet elegant design to perform detailed cryptanalysis.

Referring now to the drawings wherein like reference characters identify corresponding or similar elements throughout the several views, FIG. 1 depicts a block diagram illustrating system 101 for invertible functions implementation using parity logic in accordance with a preferred embodiment of the present application. It will be appreciated that system 101 overcomes one or more of the above-listed problems commonly associated with conventional invertible functions implemented systems.

In the contemplated embodiment, system 101 at least one hardware processors 103 with or without instructions 105, a memory 107 with or without instructions 105, an input/output (I/O) interface 111, and a network interface device 113, which communicate with each other via a bus 109. Instructions 105 may reside, completely or at least partially, within the hardware processor 103 and/or memory 107 during execution thereof by system 101. Instructions 105 may include directions for storing instructions, performing one or more functions, and the like. For example, instructions 105 may include encoding and decoding to perform one or more methodologies described herein.

System 101 also includes a network interface device 113 which facilitates communication with other computing systems (not shown in FIG. 1) via one or more networks 115. Other computing systems, for example, may include conventional computing devices as described above, internet connected devices/systems, or an external storage such as a server, or a cloud computing system.

System 101 may also be referred to as "invertible function system". System 101 may be implemented as any of a variety of conventional computing devices, including, for example, servers, a desktop PC, a notebook or portable computer, a workstation, a mainframe computer, an entertainment device, cellular phones, smart phones, personal digital assistants (PDAs), portable computers, desktop computers, a field-programmable gate array device, a microcontroller, tablet computers, phablets, an internet appliance, a receiver, a transmitter, a transceiver, data encryption drives, and the like. In one example embodiment, system 101 may be included (or integrated) in any of the computing devices, examples of which are described above.

It is contemplated and will be appreciated that system 101 may include one or more memory units, one or more hardware processors, and one or more I/O interfaces.

It is also contemplated and will be appreciated that memory 103 may include any computer-readable medium or computer program product known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, a compact disks (CDs), digital versatile disc or digital video disc (DVDs) and magnetic tapes. The memory 107 further includes module(s) (not shown in FIG. 1) to perform the methodologies described herein.

It is further contemplated and will be appreciated that memory 103 may include input data block or input data sub-block, where input data sub-block are smaller size blocks derived by subdivisions of the main input data block, comprising 'k' bits and other data bits, wherein the count of input data bits and other data bits can be identical or different. The expression 'sub-block' can be referred as 'subblock' and may be interchangeably used herein. System 101 may be connected to other computing systems via one or more networks. Other computing systems, for example, may include conventional computing devices as described above, internet connected devices/systems, or an external storage such as a server, or a cloud computing system.

It is also contemplated and will be appreciated that network 115 may be a wireless network, a wired network, or a combination thereof. The network may also be an individual network or a collection of many such individual networks, interconnected with each other and functioning as a single large network, e.g., the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, host bus adapters (HBAs), for providing a communication link between system 101 and other connected devices and/or systems.

It is also contemplated and will be appreciated that the I/O interface 111 may include a variety of software and hardware interfaces (e.g., a web interface, a graphical user interface, and the like). The I/O interface 111 may allow system 101 to interact with a user directly or through the user devices. Further, the I/O interface 111 may enable system 101 to communicate with other computing devices, such as web servers and external data servers (not shown in FIG. 1), or cloud computing systems.

It is likewise contemplated and will be appreciated that the I/O interface 111 can facilitate multiple communications within a wide variety of networks and protocol types, including wired networks, for example, LAN, cable, etc., and wireless networks, such as WLAN, cellular, or satellite. The I/O interface 111 may include one or more ports for connecting a number of devices to one another or to another server.

Figure 2:
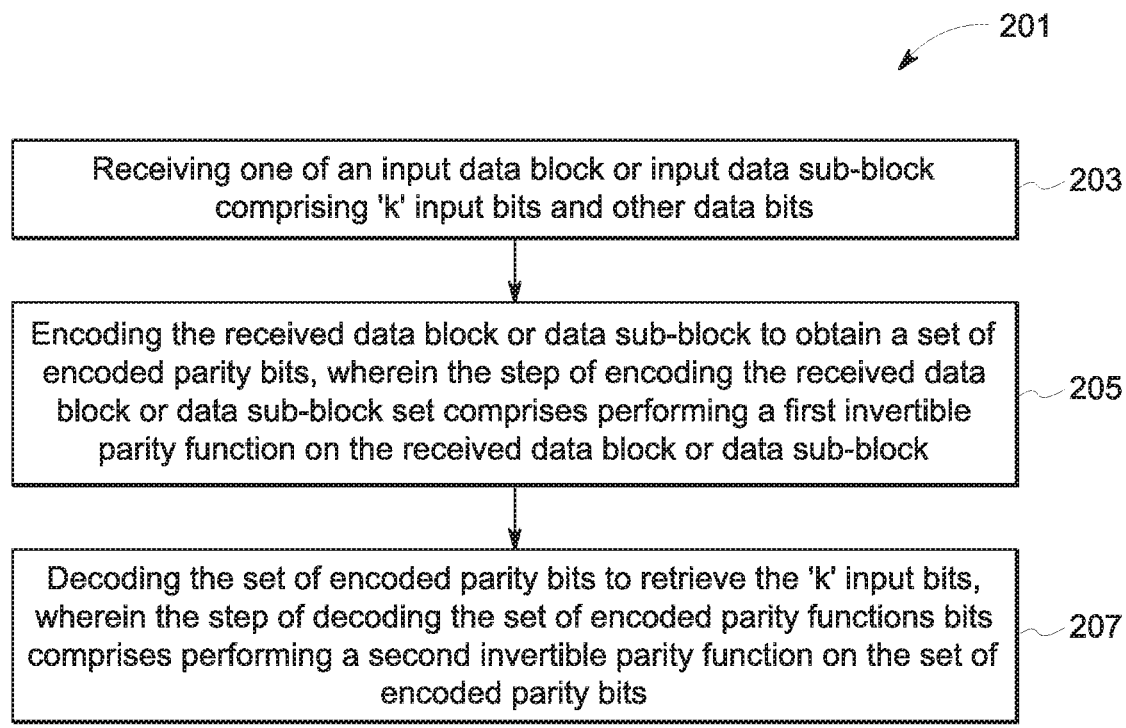
FIG. 2 depicts a high level exemplary flow diagram illustrating a processor implemented method for implementing invertible functions using parity logic according to some embodiments of the present subject matter.

Referring now to FIG. 2, with reference to FIG. 1, an exemplary flow diagram illustrating a processor implemented method for invertible functions implementation using parity logic according to some embodiments of the present subject matter is shown. The steps of the method of the present disclosure will now be explained with reference to the components of system 101 as depicted in FIG. 1, and the flow diagram of FIG. 2. The hardware processor 103 is configured by instructions 105 stored in memory 107. At step 203, the hardware processor 103 receives one of an input data block or input data subblock comprising 'k' input bits and other data bits, wherein 'k' input bits are indicative of size of the input data block or input data subblock. The following is an exemplary input data block of size 12 bits being received by system 101 of FIG. 1: Input bits: [x(1) x(2) x(3) x(4) x(5) x(6) x(7) x(8) x(9) x(10) x(11) x(12)].

In an embodiment of the present disclosure, a bit refers to a basic unit of information in information theory, computing, and digital communication that is 0 or 1 with equal probability, comprised in the an input data block or input data subblock.

At step 203 the hardware processor 103 encodes the received input data block or input data subblock to obtain a set of encoded parity bits. At step 205 the input data block of 12 bits is encoded by performing a first invertible parity function on the received input data block. The first invertible parity function is expressed as:

$$f(x_i) = \sum_{j=0}^{n} x_{(i-j)} = x_{(i-0)} + x_{(i-1)} + x_{(i-2)} + \ldots + x_{(i-n)} \quad (1)$$

where i=1, 2, 3, 4, . . . k and for all (i−j)<1, $x_{(i-j)}$=D (discard). Here, + sign represents XOR or XNOR operation, k represents the total number of bits in a block, $x_{(i-j)}$ represents (i−j)th bit of the input, $f(x_i)$ represents invertible parity function for ith bit, and n represents a parity function variable limit. Parity variable limit 'n', per encoding function, can either be a fixed value or can be derived dynamically using a group of predefined input bits or other data bits depending on the application requirements where the present disclosure and its systems and methods are implemented, in one example embodiment of the present disclosure. Selection of realizing XOR or XNOR based implementation for each encoding function and subsequent decoding function can either be predefined or can be performed dynamically using logical and arithmetic criterions derived from bits, bit pattern or comparison between the adjacent bits of input data block or other data bits, e.g., use XOR based implementation to encode ith bit if the ith bit of input data block or other bits reads value zero, or else use XNOR based implementation.

A set of encoded parity bits is generated by using the XOR realization of above first invertible parity function. The generated set of encoded parity bits for k=12 and n=3 is provided below by way of non-construing example:
Encoded bit-1: f(x1)=x(1)+x(0)+x(−1)+x(−2)=x(1)+D+D+D=x(1)
Encoded bit-2: f(x2)=x(2)+x(1)+x(0)+x(−1)=x(2)+x(1)+D+D=x(2)+x(1)
Encoded bit-3: f(x3)=x(3)+x(2)+x(1)+x(0)=x(3)+x(2)+x(1)+D=x(3)+x(2)+x(1)
Encoded bit-4: f(x4)=x(4)+x(3)+x(2)+x(1)
Encoded bit-5: f(x5)=x(5)+x(4)+x(3)+x(2)
Encoded bit-6: f(x6)=x(6)+x(5)+x(4)+x(3)
Encoded bit-7: f(x7)=x(7)+x(6)+x(5)+x(4)
Encoded bit-8: f(x8)=x(8)+x(7)+x(6)+x(5)
Encoded bit-9: f(x9)=x(9)+x(8)+x(7)+x(6)
Encoded bit-10: f(x10)=x(10)+x(9)+x(8)+x(7)
Encoded bit-11: f(x11)=x(11)+x(10)+x(9)+x(8)
Encoded bit-12: f(x12)=x(12)+x(11)+x(10)+x(9)
The above equation (1) is used to introduce the dependency/memory between encoded bits and input bits without any overhead.

Below is another example of performing the first parity invertible function for a block of size 4 bits and parity function variable limit of 2, wherein the input bits and corresponding encoded bit outputs and are listed below:
Input Bits: [x(1) x(2) x(3) x(4)]
Encoded Bit-1: f(x1)=x(1)+x(0)+x(−1)=x(1)+D+D=x(1)
Encoded Bit-2: f(x2)=x(2)+x(1)+x(0)=x(2)+x(1)+D=x(2)+x(1)
Encoded Bit-3: f(x3)=x(3)+x(2)+x(1)
Encoded Bit-4: f(x3)=x(4)+x(3)+x(2)

Below is yet another example of performing the first parity invertible function for a block of size 4 and parity function variable limit of 1, wherein the input bits and corresponding encoded bit outputs and are listed below:
Input Bits: [x(1) x(2) x(3) x(4)]
Encoded bit-1: f(x1)=x(1)+x(0)=x(1)+D=x(1)
Encoded bit-2: f(x2)=x(2)+x(1)
Encoded bit-3: f(x3)=x(3)+x(2)
Encoded bit-4: f(x4)=x(4)+x(3)

In an embodiment of the present disclosure, the step of encoding or the step of performing the first parity invertible function on the received data block or data subblock may be (or is) iteratively performed to obtain a set of encoded parity bits and to further obtain non-linearity and higher dependency between the set of encoded parity bits and the 'k' input bits. In another embodiment, the received data block or data subblock are iteratively encoded based on at least one of one or more permutation sequence boxes and one or more substitution boxes.

At step 207 the hardware processor 103 decodes the set of encoded parity bits to retrieve the input data bits. Step 207 of decoding the set of encoded parity bits comprises performing a second invertible parity function on the set of encoded parity bits, in one example embodiment of the disclosure. The second invertible parity function is expressed as:

$$x_i = f(x_i) + \sum_{j=i-n}^{i-1} x_{(j)} = f(x_i) + x_{(i-n)} + x_{(i-n+1)} + \ldots + x_{(i-1)} \quad (2)$$

where i=1, 2, 3, 4, . . . k, for all (j)<1, $x_{(j)}$=D (discard), and for n=0, $$\sum_{j=i-n}^{i-1} x_{(j)} = D(\text{discard}).$$

Here, + sign represents XOR or XNOR operation used during the encoding process, k represents the total number of bits in an input data block or data subblock, $x_i$ represents decoding function for ith bit, $f(x_i)$ represents ith encoded bit, n represents parity function variable limit used during the encoding, $x_{(j)}$ represents jth decoded bit. For instance, in system 101 or a receiver comprised in the system receives the following exemplary bits:
Received bits: [f(x1) f(x2) f(x3) f(x4) f(x5) f(x6) f(x7) f(x8) f(x9) f(x10) f(x11) f(x12)]

The second invertible parity function is applied on the above received bits to retrieve original 'k' bits comprised in the input data block. Below are the exemplary original bits being retrieved by the system upon performing the second invertible parity function for k=12 and n=3:
Decoded bit-1: x(1)=f(x1) or x(1)=f(x1)+x(−2)+x(−1)+x(0)=f(x1)+D+D+D=f(x1)
Decoded bit-2: x(2)=f(x2)+f(x1) or x(2)=f(x2)+x(−1)+x(0)+x(1)=f(x2)+D+D+x(1)=f(x2)+x(1)
Decoded bit-3: x(3)=f(x3)+f(x2) or x(3)=f(x3)+x(0)+x(1)+x(2)=f(x2)+D+x(1)+x(2)=f(x3)+x(2)+x(1)
Decoded bit-4: x(4)=f(x4)+f(x3) or x(4)=f(x4)+x(3)+x(2)+x(1)

Decoded bit-5: $x(5)=f(x5)+f(x4)+f(x1)$ or $x(5)=f(x5)+x(4)+x(3)+x(2)$

Decoded bit-6: $x(6)=f(x6)+f(x5)+f(x2)+f(x1)$ or $x(6)=f(x6)+x(5)+x(4)+x(3)$

Decoded bit-7: $x(7)=f(x7)+f(x6)+f(x3)+f(x2)$ or $x(7)=f(x7)+x(6)+x(5)+x(4)$

Decoded bit-8: $x(8)=f(x8)+f(x7)+f(x4)+f(x3)$ or $x(8)=f(x8)+x(7)+x(6)+x(4)$

Decoded bit-9: $x(9)=f(x9)+f(x8)+f(x5)+f(x4)+f(x1)$ or $x(9)=f(x9)+x(8)+x(7)+x(6)$ Decoded bit-10: $x(10)=f(x10)+f(x9)+f(x6)+f(x5)+f(x2)+f(x1)$ or $x(10)=f(x10)+x(9)+x(8)+x(7)$ Decoded bit-11: $x(11)=f(x11)+f(x10)+f(x7)+f(x6)+f(x3)+f(x2)$ or $x(11)=f(x11)+x(10)+x(9)+x(8)$ Decoded bit-12: $x(12)=f(x12)+f(x11)+f(x8)+f(x7)+f(x4)+f(x3)$ or $x(12)=f(x12)+x(11)+x(10)+x(9)$ As it can be seen from the encoded bits equations, encoded bits 4 through 12 are function of four input bits. Repeating above encoding steps with appropriate permutation sequence and substitution box will result in nonlinearity and higher dependency between encoded bits and input bits, i.e., each encoded bit will be function of multiple input bits. It is to be understood by person having ordinary skill in the art and the person skilled in the art that the above step 207 may or may not be utilized depending on the application area, i.e., step 207 is redundant for hash function applications. It is further to be noted that an identical parity function variable limit is used for performing both the first invertible and the second invertible parity function. However, determination of parity function variable limit for individual encoding-decoding function can be accomplished using a constant value, as presented in the examples, or dynamically. Selecting individual parity function variable limit dynamically, using a predefined or dynamically derived group of input bits or other data bits, provides better nonlinearity. In one dynamic implementation, the parity function variable limit for encoding each bit is defined by an equivalent decimal value obtained using the predefined bit group from input bits or other data bits, e.g., for encoding bit number 2, use the parity function variable limit obtained by converting the predefined first 2 input bits or other data bits into an equivalent decimal value, for encoding bit number 3, use the parity function variable limit obtained by converting the predefined input bits or other data bits 3 and 4 into an equivalent decimal value, and so on. In another dynamic implementation, the parity function variable limit for each encoding function is defined by an equivalent decimal value obtained using the dynamically derived bit group from input bits or other data bits.

The invertible parity function as implemented by systems and methods of the present disclosure can be done at both software and hardware level. The overall design is simple to scale and analyze against different attacks and can be implemented in systems for cryptography and hash functions that would allow understand the design sustainability, vulnerability, and association between advances in security margin with increase in block size. Further, the invertible parity function gradually increases the number of variables for subsequent parity function to a certain value starting with single variable. This gradual increase in parity function variables guarantees the invertibility at the receiver-end without any overhead, and also introduces interdependency (memory) between encoded bits and input bits, thereby offering an efficient way of implementing the avalanche effect with easy scalability.

The method of invertible parity function can also be implemented at byte or word level by using appropriate lookup tables to improve the execution speed during hardware or software implementation.

Further the present disclosure and its systems and methods can be used various applications for example, but not limited to, in cryptographic hash function generators, symmetric encryption, error correction and error detection areas, random number generators and the like.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating" or "monitoring" or "displaying" or "tracking" or "identifying" "or receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A processor implemented method comprising:
receiving, via one or more hardware processors and interfaces, one of an input data block or input data subblock comprising 'k' input bits and other data bits, wherein the count of input data bits and other data bits can be identical or different;
encoding, via the one or more hardware processors and memory, the received input data block or input data subblock to obtain a set of encoded parity bits, wherein the step of encoding the received data block or data subblock set comprises performing a first invertible parity function on the received data block or data subblock, and wherein for the data block or data subblock comprising 'k' input bits, the first invertible parity function is expressed as:

$$f(x_i) = \sum_{j=0}^{n} x_{(i-j)} = x_{(i-0)} + x_{(i-1)} + x_{(i-2)} + \ldots + x_{(i-n)}$$

where i=1, 2, 3, 4, . . . k, $f(x_i)$ represents an encoding function for ith bit, + sign represents XOR or XNOR operation, n is a whole number representing parity function variable limit, $x_{(i-j)}$ represents (i–j)th input bit, and for all (i–j)<1, $x_{(i-j)}$=D (discard); and decoding, via the one or more hardware processors and memory, the set of encoded parity bits to retrieve the 'k' input bits, wherein the step of decoding the set of encoded parity bits comprises performing a second invertible parity function on the set of encoded parity bits, and wherein the second invertible parity function is expressed as:

$$x_i = f(x_i) + \sum_{j=i-n}^{i-1} x_{(j)} = f(x_i) + x_{(i-n)} + x_{(i-n+1)} + \ldots + x_{(i-1)}$$

where i=1, 2, 3, 4, . . . k, + sign represents XOR or XNOR operation used during the encoding process, $x_i$ represents decoding function for ith bit, $f(x_i)$ represents ith encoded bit, n represents parity function variable limit used during the encoding, $x_{(j)}$ represents jth decoded bit, for all (j)<1, $x_{(j)}$=D (discard), and for n=0, $$\sum_{j=i-n}^{i-1} x_{(j)} = D(\text{discard}).$$

2. The processor implemented method as claimed in claim 1, wherein an identical parity function variable limit is selected for performing the first invertible parity function and the second invertible parity function to perform the step of encoding and decoding of each individual bit.

3. The processor implemented method as claimed in claim 2, wherein the identical parity function variable limit for each encoding-decoding function pair is one of a constant value or dynamically derived using a predefined or dynamically derived group of input bits or other data bits.

4. The processor implemented method as claimed in claim 3, wherein use of XOR or XNOR operation for each encoding function is one of predefined or dynamically assigned using input bits or other data bits; and subsequent decoding functions are defined accordingly based on the encoding functions.

5. The processor implemented method as claimed in claim 4, further comprising iteratively performing the step of encoding the received input data block or input data subblock to obtain a set of encoded parity bits with higher dependency between the set of encoded parity bits and the 'k' input bits or other data bits.

6. The processor implemented method as claimed in claim 5, wherein the received input data block or input data subblock are iteratively encoded using at least one of one or more permutation sequence boxes, one or more substitution boxes and amalgamation with any existing cryptographic or hash function algorithms.

7. A system comprising:
a memory storing instructions;
one or more communication interfaces; and
one or more hardware processors communicatively coupled to said memory through said one or more communication interfaces, wherein said one or more hardware processors are configured by said instructions to:
receive one of an input data block or input data subblock comprising 'k' input bits and other data bits, wherein the count of input data bits and other data bits can be identical or different;
encode the received input data block or input data subblock to obtain a set of encoded parity bits, wherein the step of encoding the received data block or data subblock set comprises performing a first invertible parity function on the received data block or data subblock for the data block or data subblock comprising 'k' input bits, and wherein the first invertible parity function is expressed as:

$$f(x_i) = \sum_{j=0}^{n} x_{(i-j)} = x_{(i-0)} + x_{(i-1)} + x_{(i-2)} + \ldots + x_{(i-n)}$$

where i=1, 2, 3, 4, . . . k, $f(x_i)$ represents an encoding function for ith bit, + sign represents XOR or XNOR operation, n is a whole number representing parity function variable limit, $x_{(i-j)}$ represents (i-j)th input bit, and for all (i-j)<1, $x_{(i-j)}$=D (discard); and decode the set of encoded parity bits to retrieve the 'k' input bits, wherein the step of decoding the set of encoded parity bits comprises performing a second invertible parity function on the set of encoded parity bits, and wherein the second invertible parity function is expressed as:

$$x_i = f(x_i) + \sum_{j=i-n}^{i-1} x_{(j)} = f(x_i) + x_{(i-n)} + x_{(i-n+1)} + \ldots + x_{(i-1)}$$

where i=1, 2, 3, 4, . . . k, + sign represents XOR or XNOR operation used during the encoding process, $x_i$ represents decoding function for ith bit, $f(x_i)$ represents ith encoded bit, n represents parity function variable limit used during the encoding, $x_{(j)}$ represents jth decoded bit, for all (j)<1, $x_{(j)}$=D (discard), and for n=0, $$\sum_{j=i-n}^{i-1} x_{(j)} = D(\text{discard}).$$

8. The system of claim 7, wherein an identical parity function variable limit is selected for performing the first invertible parity function and the second invertible parity function to perform the step of encoding and decoding of each individual bit.

9. The system of claim 8, wherein the identical parity function variable limit for each encoding-decoding function pair is one of a constant value or dynamically derived using a predefined or dynamically derived group of input bits or other data bits.

10. The system of claim 9, wherein use of XOR or XNOR operation for each encoding function is one of predefined or dynamically assigned using input bits or other data bits, and subsequent decoding functions are derived accordingly based on encoding functions.

11. The system of claim 10, wherein the received input data block or input data subblock are iteratively encoded to obtain a set of encoded parity bits with higher dependency between the set of encoded parity bits and the 'k' input bits.

12. The system of claim 11, wherein the received input data block or input data subblock are iteratively encoded using at least one of one or more permutation sequence boxes, one or more substitution boxes and amalgamation with any existing cryptographic or hash function algorithms.

\* \* \* \* \*